United States Patent
Kang et al.

(10) Patent No.: US 10,027,895 B2
(45) Date of Patent: Jul. 17, 2018

(54) DUAL CAMERA MODULE AND METHOD FOR CONTROLLING THE SAME

(71) Applicant: LG ELECTRONICS INC., Seoul (KR)

(72) Inventors: Hyungjoo Kang, Seoul (KR); Sungdu Kwon, Seoul (KR); Youngman Kwon, Seoul (KR); Samnyol Hong, Seoul (KR); Jayong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/585,327

(22) Filed: May 3, 2017

(65) Prior Publication Data

US 2017/0324906 A1 Nov. 9, 2017

Related U.S. Application Data

(60) Provisional application No. 62/331,444, filed on May 4, 2016.

(30) Foreign Application Priority Data

Sep. 13, 2016 (KR) ........................ 10-2016-0117823

(51) Int. Cl.
| | |
|---|---|
| *H04N 5/232* | (2006.01) |
| *G02B 7/08* | (2006.01) |
| *G02B 7/28* | (2006.01) |
| *G02B 27/64* | (2006.01) |
| *G03B 13/36* | (2006.01) |
| *H04N 5/225* | (2006.01) |

(Continued)

(52) U.S. Cl.
CPC ........... *H04N 5/23287* (2013.01); *G02B 7/08* (2013.01); *G02B 7/28* (2013.01); *G02B 27/646* (2013.01);

(Continued)

(58) Field of Classification Search
CPC ........... H04N 5/23287; H04N 5/23258; H04N 5/2258; H04N 5/23248; H04N 5/2253;

(Continued)

(56) References Cited

U.S. PATENT DOCUMENTS

| | | | | |
|---|---|---|---|---|
| 2010/0277619 | A1* | 11/2010 | Scarff ................. | H04N 5/2258 348/240.1 |
| 2012/0257065 | A1* | 10/2012 | Velarde ................ | H04N 5/2258 348/175 |

(Continued)

FOREIGN PATENT DOCUMENTS

| | | |
|---|---|---|
| CN | 204667028 U | 9/2015 |
| CN | 204807890 U | 11/2015 |

(Continued)

*Primary Examiner* — Timothy J Henn
(74) *Attorney, Agent, or Firm* — Birch, Stewart, Kolasch & Birch, LLP

(57) ABSTRACT

A dual camera module that includes a voice coil motor actuator and a method for controlling the same are disclosed. The dual camera module comprises a first camera including a first lens module; a second camera including a second lens module, arranged to adjoin the first camera; and a controller for controlling the first camera and the second camera, wherein the controller identifies whether the first camera includes a first sensing module for sensing movement of the first lens module if a camera execution command is received, identifies whether the second camera includes a second sensing module for sensing movement of the second lens module if the first camera includes the first sensing module, identifies whether the first sensing module of the first camera and the second sensing module of the second camera have the same type as each other if the second camera includes the second sensing module, and controls the first camera and the second camera at different time zones if the first sensing module and the second sensing module have the same types as each other.

20 Claims, 19 Drawing Sheets

(51) Int. Cl.
*H04N 5/247* (2006.01)
*H04M 1/02* (2006.01)

(52) U.S. Cl.
CPC ........... *G03B 13/36* (2013.01); *H04N 5/2253* (2013.01); *H04N 5/2258* (2013.01); *H04N 5/23248* (2013.01); *H04N 5/23258* (2013.01); *H04N 5/247* (2013.01); *H04M 1/0264* (2013.01); *H04N 5/2257* (2013.01)

(58) Field of Classification Search
CPC ... H04N 5/2257; H04N 5/247; H04M 1/0264; G02B 7/08; G02B 27/646; G02B 7/28; G03B 13/36
See application file for complete search history.

(56) References Cited

U.S. PATENT DOCUMENTS

| | | | | |
|---|---|---|---|---|
| 2015/0085083 A1* | 3/2015 | Chen | ................. | H04N 13/0296 348/49 |
| 2016/0366398 A1* | 12/2016 | Chen | ................. | H04N 5/2258 |
| 2016/0381346 A1* | 12/2016 | Hsu | ................. | H04N 5/2257 348/47 |
| 2017/0082823 A1* | 3/2017 | Hwang | ................. | G02B 7/021 |
| 2017/0085764 A1* | 3/2017 | Kim | ................. | H04N 5/2258 |
| 2017/0150061 A1* | 5/2017 | Shabtay | ................. | H04N 5/23296 |
| 2017/0315376 A1* | 11/2017 | Hu | ................. | G02B 27/646 |
| 2017/0329151 A1* | 11/2017 | Hu | ................. | G02B 27/646 |
| 2018/0027185 A1* | 1/2018 | Miller | ................. | H04N 5/23287 |
| 2018/0048799 A1* | 2/2018 | Bachar | ................. | H04N 5/2258 |

FOREIGN PATENT DOCUMENTS

| | | |
|---|---|---|
| EP | 2512118 A1 | 10/2012 |
| KR | 10-2006-0071583 A | 6/2006 |
| KR | 10-2007-0078808 A | 8/2007 |
| KR | 10-2011-0135502 A | 12/2011 |
| KR | 10-2013-0039108 A | 4/2013 |
| KR | 10-2016-0005927 A | 1/2016 |
| WO | WO 2015/124966 A1 | 8/2015 |

* cited by examiner

DUAL CAMERA MODULE AND METHOD FOR CONTROLLING THE SAME

CROSS REFERENCE TO RELATED APPLICATIONS

This application claims priority under 35 U.S.C. § 119 to U.S. Application No. 62/331,444, filed in U.S. on 4 May 2016 and Korean Application No. 10-2016-0117823, filed in Korea on 13 Sep. 2016, which are hereby incorporated in its entirety by reference as if fully set forth herein.

BACKGROUND OF THE INVENTION

Field of the Invention

The present invention relates to a dual camera module, and more particularly, to a dual camera module, which includes a voice coil motor actuator, and a method for controlling the same.

Discussion of the Related Art

Recently, with the development of technology, mobile terminals having multiple functions integrated with high density are being released, and tend to be miniaturized and lightweight to be suitable for a mobile condition in spite of a variety of functions.

Therefore, a camera module installed in a mobile terminal such as a cellular phone and a laptop computer also tends to be miniaturized due to a subminiature and high precision tendency of a lens.

An optical system of a camera module needs an auto-focus function for allowing a user to clearly view a target object which is a subject.

In the auto-focus function, various types of actuators are used to move a lens module to an optimal focal position. Auto-focus performance of the camera module may be varied depending on characteristics of the actuator that moves the lens module.

Also, the auto-focus actuator may include various types of actuators such as a voice coil motor (VCM) actuator, an actuator driven by a piezoelectric power, and a MEMS actuator driven by capacitance.

In this case, the camera module based on the voice coil motor actuator configures a magnetic circuit by arranging a permanent magnet in a fixed module of the camera module and attaching a coil to a lens module, which will be driven, whereby the lens module is driven by Lorentz's force that flows in the coil.

As described above, the voice coil motor type camera module may calculate an optimal auto-focus value of the lens module by extracting a difference of magnetic flux values according to displacement of the lens module using a hall sensor.

Recently, a dual camera module that includes two cameras is applied to a mobile terminal, etc. When a camera module that includes a hall sensor is applied to the dual camera module, a magnetic force of the camera module acts on its adjacent camera module, whereby signal interference occurs between the camera modules. As a result, a movement position of the lens cannot be sensed exactly, and an error in the auto-focus position of the lens occurs.

In this respect, a dual camera module that may cancel signal interference will be required.

SUMMARY OF THE INVENTION

Accordingly, the present invention is directed to a dual camera module and a method for controlling the same, which substantially obviate one or more problems due to limitations and disadvantages of the related art.

An object of the present invention is to provide a dual camera module and a method for controlling the same, in which a control time of first and second cameras is controlled depending on whether sensor types of the first and second cameras are the same as each other to cancel signal interference occurring between the first and second cameras.

Another object of the present invention is to provide a dual camera module and a method for controlling the same, in which specification information of cameras is received from any one of a memory, an external server and an installed camera to exactly identify sensor types of the cameras.

Still another object of the present invention is to provide a dual camera module and a method for controlling the same, in which an optical image stabilization (OIS) compensator is arranged at any one of first and second cameras to compensate for shaking of a lens module.

Further still another object of the present invention is to provide a dual camera module and a method for controlling the same, in which a damper is arranged between a spring and a lens module to reduce natural frequency of the spring, whereby an error in auto-focus may be avoided and auto-focus time may be reduced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a dual camera module according to one embodiment of the present invention comprises a first camera including a first lens module; a second camera including a second lens module, arranged to adjoin the first camera; and a controller for controlling the first camera and the second camera, wherein the controller identifies whether the first camera includes a first sensing module for sensing movement of the first lens module if a camera execution command is received, identifies whether the second camera includes a second sensing module for sensing movement of the second lens module if the first camera includes the first sensing module, identifies whether the first sensing module of the first camera and the second sensing module of the second camera have the same type as each other if the second camera includes the second sensing module, and controls the first camera and the second camera at different time zones if the first sensing module and the second sensing module have the same types as each other.

In another aspect, a method for controlling a dual camera module according to one embodiment of the present invention comprises the steps of identifying whether a camera execution command is received; identifying whether a first camera includes a first sensing module for sensing movement of a first lens module if the camera execution command is received, identifying whether a second camera includes a second sensing module for sensing movement of a second lens module if the first camera includes the first sensing module, identifying whether the first sensing module of the first camera and the second sensing module of the second camera have the same type as each other if the second camera includes the second sensing module, and controlling the first camera and the second camera at different time zones if the first sensing module and the second sensing module have the same types as each other.

It is to be understood that both the foregoing general description and the following detailed description of the present invention are exemplary and explanatory and are intended to provide further explanation of the invention as claimed.

BRIEF DESCRIPTION OF THE DRAWINGS

Arrangements and embodiments may be described in detail with reference to the following drawings in which like reference numerals refer to like elements and wherein.

DETAILED DESCRIPTION OF THE INVENTION

Figure 1:
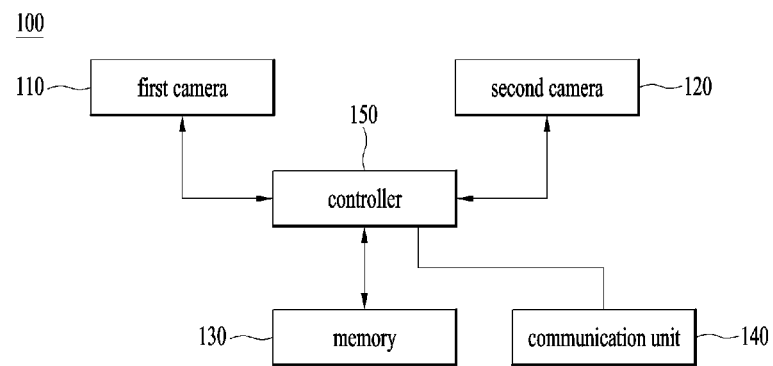
FIG. 1 is a block schematic diagram illustrating a dual camera module according to the present invention.

Reference will now be made in detail to the preferred embodiments of the present specification, examples of which are illustrated in the accompanying drawings. Wherever possible, the same reference numbers will be used throughout the drawings to refer to the same or like parts. The suffixes "module" and "unit" for the elements used in the following description are given or used in common by considering facilitation in writing this disclosure only but fail to have meanings or roles discriminated from each other. Also, in description of the embodiments disclosed in this specification, if detailed description of the disclosure known in respect of the present invention is determined to make the subject matter of the embodiments disclosed in this specification obscure, the detailed description will be omitted. Also, the accompanying drawings are only intended to facilitate understanding of the embodiments disclosed in this specification, and it is to be understood that technical spirits disclosed in this specification are not limited by the accompanying drawings and the accompanying drawings include all modifications, equivalents or replacements included in technical spirits and technical scope of the present invention.

Although the terms such as "first" and/or "second" in this specification may be used to describe various elements, it is to be understood that the elements are not limited by such terms. The terms may be used to identify one element from another element.

The expression that an element is "connected" or "coupled" to another element should be understood that the element may directly be connected or coupled to another element, a third element may be interposed between the corresponding elements, or the corresponding elements may be connected or coupled to each other through a third element. On the other hand, the expression that an element is "directly connected" or "directly coupled" to another element" should be understood that no third element exists therebetween.

It is to be understood that the singular expression used in this specification includes the plural expression unless defined differently on the context.

In this application, it is to be understood that the terms such as "include" and "has" are intended to designate that features, numbers, steps, operations, elements, parts, or their combination, which are disclosed in the specification, exist, and are intended not to previously exclude the presence or optional possibility of one or more other features, numbers, steps, operations, elements, parts, or their combinations.

A camera module described in this specification is applicable to a cellular phone, a smart phone, a laptop computer, a digital broadcast terminal, a personal digital assistant (PDA), a portable multimedia player (PMP), a navigator, a slate PC, a tablet PC, an ultrabook, a wearable device (for example, a smart watch, a smart glass, a head mounted display (HMD)), etc.

However, it will be apparent to those skilled in the art that the camera module disclosed in this specification may be applied to a fixed terminal such as a digital TV, a desktop computer, and a digital signage except that the camera module is applicable to a mobile terminal only.

FIG. 1 is a block schematic diagram illustrating a dual camera module according to the present invention.

As shown in FIG. 1, the dual camera module 100 may include a first camera 110, a second camera 120, a memory 130, a communication unit 140, and a controller 150.

In this case, the first camera 110 may include a first lens module, and the second camera 120 may include a second lens module arranged to adjoin the first camera 110.

For example, at least one of the first and second cameras 110 and 120 may be a fixed focus camera.

In this case, the fixed focus camera may include a fixed module provided with a through hole, a lens module having at least one lens, fixed within the through hole of the fixed module, and an image sensor for sensing an image incident through a lens of the lens module.

As the case may be, the fixed focus camera may further include an optical image stabilization (OIS) compensator for compensating for shaking of the lens module.

For another example, at least one of the first and second cameras 110 and 120 may be an auto-focus camera that includes a magnetic sensor.

In this case, the auto-focus camera that includes a magnetic sensor may include a fixed module provided with a through hole, a lens module having at least one lens and linearly moving within the through hole of the fixed module, a moving coil surrounding an outer circumference of the lens module, a plurality of magnets arranged on an inner side of the through hole of the fixed module, a magnetic sensor arranged on the inner side of the through hole of the fixed module, sensing a change of a magnetic flux according to movement of the lens module, a magnetic flux distortion protrusion protruded from the outer circumference of the lens module, distorting a flow of a magnetic flux according to movement of the lens module, and an image sensor for sensing an image incident through the lens of the lens module.

As the case may be, the auto-focus camera that includes a magnetic sensor may further include an OIS compensator that compensates for shaking of the lens module.

For another example, at least one of the first and second cameras 110 and 120 may be an auto-focus camera that includes a coil sensor.

In this case, the auto-focus camera that includes a coil sensor may include a fixed module provided with a through hole, a lens module having at least one lens and linearly moving within the through hole of the fixed module, a moving coil surrounding an outer circumference of the lens module, a coil sensor arranged in the fixed module, receiving a current or voltage varied depending on a distance with the moving coil from the moving coil, and an image sensor for sensing an image incident through the lens of the lens module.

As the case may be, the auto-focus camera that includes a coil sensor may further include an OIS compensator that compensates for shaking of the lens module.

Meanwhile, the controller 150 may identify whether a first sensing module of the first camera 110 and a second sensing module of the second camera 120 have the same type as each other if a camera execution command is received, and may control the first camera 110 and the second camera 120 at different time zones if the first sensing module and the second sensing module have the same type as each other.

This is because that signal interference according to magnet movement of the second camera 120 may occur during driving of the first camera 110 to adversely affect a focus position sensing signal of the first camera 110 and signal interference according to magnet movement of the first camera 110 may occur during driving of the second camera 120 to adversely affect a focus position sensing signal of the second camera 120 if the first sensing module of the first camera 110 and the second sensing module of the second camera 120 have the same types as each other.

Therefore, the controller 150 may identify types of sensors that sense focus positions of the first and second cameras 110 and 120, perform driving control of the first and second cameras 110 and 120 at different time zones if the types of the sensors are the same as each other, and perform driving control of the first and second cameras 110 and 120 at the same time if the types of the sensors are different from each other, whereby signal interference between the two cameras may be minimized to perform an exact and fast auto-focus.

As one embodiment, the dual camera module 100 of the present invention may further include a body unit having a groove to which the first and second cameras 110 and 120 are fixed, a memory 130 for storing at least one of specification information and identification information for the first and second cameras 110 and 120, and a communication unit 140 for performing communication with an external server.

In this case, the controller 150 may identify whether the first camera 110 includes a first sensing module for sensing movement of the first lens module, on the basis of specification information of the first camera 110, which is stored in the memory 130.

As the case may be, when identifying whether the first camera 110 includes the first sensing module that senses movement of the first lens module, the controller 150 may transmit the identification information of the first camera 110, which is stored in the memory 130, to the external server, receive the specification information of the first camera 110 from the external server and identify whether the first camera 110 includes the first sensing module, on the basis of the received specification information of the first camera 110.

Also, the controller may identify whether to include the specification information of the second camera 120, which is stored in the memory 130, when identifying whether the second camera 120 includes the second sensing module that senses movement of the second lens module.

As the case may be, when identifying whether the second camera 120 includes the second sensing module that senses movement of the second lens module, the controller 150 may transmit the identification information of the second camera 120, which is stored in the memory 130, to the external server, receive the specification information of the second camera 120 from the external server and identify whether the second camera 120 includes the second sensing module, on the basis of the received specification information of the second camera 120.

Also, when identifying whether the first sensing module of the first camera 110 and the second sensing module of the second camera 120 have the same types as each other, the controller may identify types of the first and second sensing modules on the basis of the specification information of the first and second cameras 110 and 120, which is stored in the memory 130.

As the case may be, when identifying whether the first sensing module of the first camera 110 and the second sensing module of the second camera 120 have the same types as each other, the controller 150 may transmit the identification information of the first and second cameras 110 and 120, which is stored in the memory 130, to the external server, receive the specification information of the first and second cameras 110 and 120 from the external server and identify the types of the first and second sensing modules on the basis of the received specification information of the first and second cameras 110 and 120.

As another embodiment, the dual camera module 100 of the present invention may further include a body unit having a groove from or to which the first and second cameras 110 and 120 are detached or fixed, a memory 130 for storing specification information for the first and second cameras 110 and 120, and a communication unit 140 for performing communication with an external server.

In this case, when identifying whether the first camera 110 includes the first sensing module that senses movement of the first lens module, the controller 150 may receive the identification information from the first camera 110, extract the specification information of the first camera 110, which corresponds to the received identification information, from the memory 130, and identify whether the first camera 110 includes the first sensing module, on the basis of the extracted specification information of the first camera 110.

As the case may be, when identifying whether the first camera 110 includes the first sensing module that senses movement of the first lens module, the controller 150 may receive the identification information from the first camera 110, transmit the received identification information to the external server, receive the specification information of the first camera 110 from the external server, and identify whether the first camera 110 includes the first sensing module, on the basis of the received specification information of the first camera 110.

Also, when identifying whether the second camera 120 includes the second sensing module that senses movement of the second lens module, the controller 150 may receive the identification information from the second camera 120, extract the specification information of the second camera 120, which corresponds to the received identification information, from the memory 130, and identify whether the second camera 120 includes the second sensing module, on the basis of the extracted specification information of the second camera 120.

As the case may be, when identifying whether the second camera 120 includes the second sensing module that senses movement of the second lens module, the controller 150 may receive the identification information from the second camera 120, transmit the received identification information to the external server, receive the specification information of the second camera 120 from the external server, and identify whether the second camera 120 includes the second sensing module, on the basis of the received specification information of the second camera 120.

Also, when identifying whether the first sensing module of the first camera 110 and the second sensing module of the second camera 120 have the same types as each other, the controller 150 may receive the identification information from the first and second cameras 110 and 120, extract the specification information of the first and second cameras 110 and 120, which corresponds to the received identification information, from the memory 130, and identify whether the types of the first and second sensing modules are the same as each other, on the basis of the extracted specification information of the first and second cameras 110 and 120.

As the case may be, when identifying whether the first sensing module of the first camera 110 and the second sensing module of the second camera 120 have the same types as each other, the controller 150 may receive the identification information from the first and second cameras 110 and 120, transmit the received identification information to the external server, receive the specification information of the first and second cameras 110 and 120 from the external server, and identify whether the types of the first and second sensing modules are the same as each other, on the basis of the received specification information of the first and second cameras 110 and 120.

For example, when identifying whether the first sensing module of the first camera 110 and the second sensing module of the second camera 120 have the same types as each other, the controller 150 may control the first camera 110 and the second camera 120 at different time zones if the first and second sensing modules are coil sensors.

In this case, the coil sensor may be a sensor that senses a current or voltage varied depending on the distance with the first lens module or the second lens module.

That is, when the controller 150 controls the first camera 110 and the second camera 120 at different time zones, the time zone that a driving signal for controlling movement of the first lens module is applied to the first camera 110 may be different from the time zone that a driving signal for controlling movement of the second lens module is applied to the second camera 120.

For another example, when identifying whether the first sensing module of the first camera 110 and the second sensing module of the second camera 120 have the same types as each other, the controller 150 may control the first camera 110 and the second camera 120 at different time zones if the first and second sensing modules are magnetic sensors.

In this case, the magnetic sensor may be a sensor that may sense a change of a magnetic flux according to movement of the first lens module or the second lens module, and may be at least one of, but not limited to, a hall sensor, a magnetic resistance sensor, and a search coil sensor.

That is, when the controller 150 controls the first camera 110 and the second camera 120 at different time zones, the time zone that a driving signal for controlling movement of the first lens module is applied to the first camera 110 may be different from the time zone that a driving signal for controlling movement of the second lens module is applied to the second camera 120.

Also, when identifying whether the first camera 110 includes the first sensing module that senses movement of the first lens module, the controller 150 may drive the first camera 110 and the second camera 120 at the same time if the first camera 110 does not include the first sensing module.

As another case, when identifying whether the second camera 110 includes the second sensing module that senses movement of the second lens module, the controller 150 may drive the first camera 110 and the second camera 120 at the same time if the second camera 120 does not include the second sensing module.

As still another case, when identifying whether the first sensing module of the first camera 110 and the second sensing module of the second camera 110 have the same types as each other, the controller 150 may drive the first camera 110 and the second camera 120 at the same time if the first sensing module and the second sensing module does not have the same types as each other.

As described above, according to the present invention, the control time of the first and second cameras 110 and 120 may be controlled depending on whether the sensor types of the first and second cameras 110 and 120 are the same as each other, whereby signal interference occurring between the first and second cameras 110 and 120 may be cancelled.

Also, according to the present invention, specification information of the camera may be received from any one of the memory, the external server, the installed camera, whereby the sensor type of the camera may be identified exactly.

Figure 2:
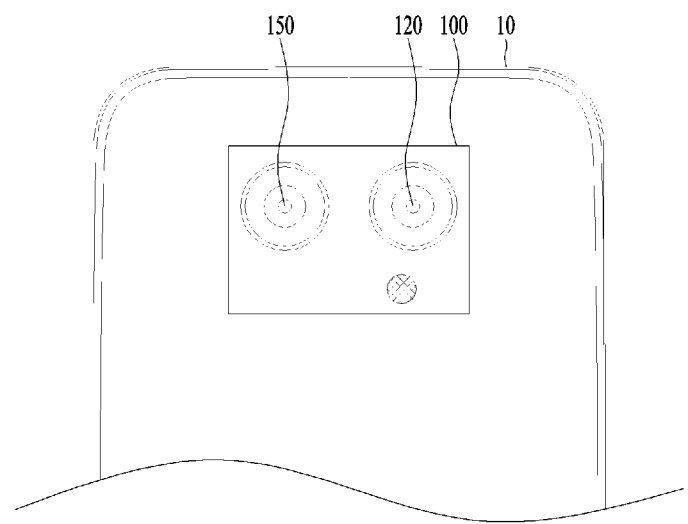
FIG. 2 is a diagram illustrating a mobile terminal in which a dual camera module according to the present invention is installed.

FIG. 2 is a diagram illustrating a mobile terminal in which a dual camera module according to the present invention is installed.

As shown in FIG. 2, the dual camera module 100 of the present invention may be installed in a part of a main body of the mobile terminal 10 to take a predetermined image.

In this case, the dual camera module 100 may include a first camera 110 that includes a first lens module, and a second camera 120 that includes a second lens module and is arranged to adjoin the first camera 110.

The controller may control the first camera 110 and the second camera 120, and may be included in the dual camera module 100 or the mobile terminal 10.

Also, the first and second cameras 110 and 120 may be fixed types that are fixed to a holder of the dual camera module 100. As the case may be, the first and second cameras 110 and 120 may be detachable types that are detached from or fixed to the holder of the dual camera module 100.

Therefore, the controller may minimize signal interference between the cameras by performing a driving control mode differently depending on the types of the first and second cameras 110 and 120 installed in the dual camera module 100.

Figure 3:
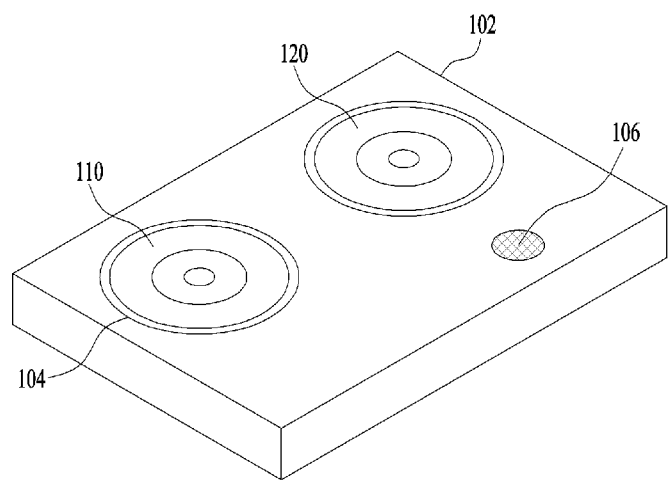
FIGS. 3 to 5 are diagrams illustrating a driving mode of a dual camera module according to the first embodiment of the present invention.
Figure 4:
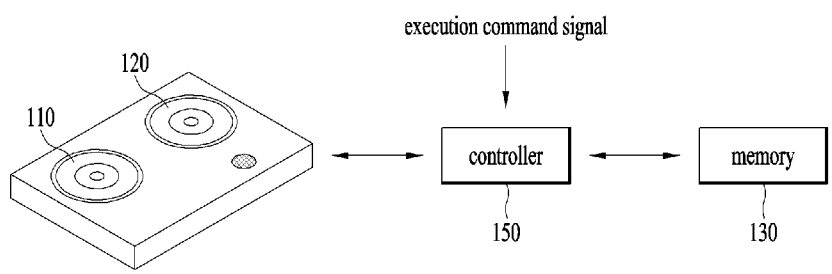
Figure 5:
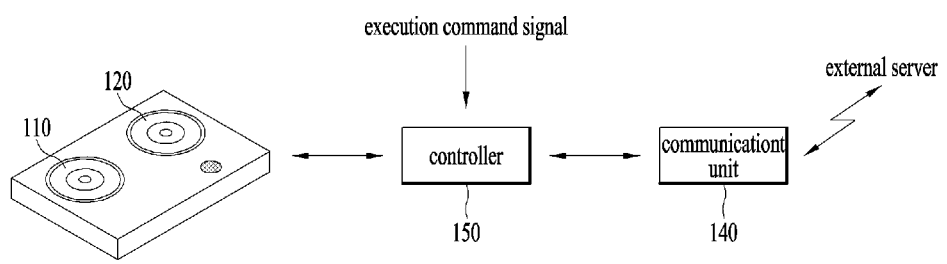

FIGS. 3 to 5 are diagrams illustrating a driving mode of a dual camera module according to the first embodiment of the present invention.

As shown in FIG. 3, the dual camera module according to the first embodiment of the present invention is a fixed type, in which the first and second cameras 110 and 120 are fixed within a groove 104 of a body unit 102.

In this case, the body unit 102 of the dual camera module may additionally be provided with a light emitting module 106.

As shown in FIG. 4, in the fixed type dual camera module, if a camera execution command is received, the controller 150 may identify whether the first camera 110 includes the first sensing module that senses movement of the first lens module, and if the first camera 110 includes the first sensing module, may identify whether the second camera 120 includes the second sensing module that senses movement of the second lens module.

In this case, when identifying whether the first camera 110 includes the first sensing module, the controller 150 may identify whether the first camera 110 includes the first sensing module, on the basis of the specification information of the first camera, which is stored in the memory 130.

At this time, the specification information of the first camera 110 and the second camera 120 may previously be stored in the memory 130.

Also, when identifying whether the second camera 120 includes the second sensing module that senses movement of the second lens module, the controller 150 may identify whether the second camera 120 includes the second sensing module, on the basis of the specification information of the second camera 120, which is stored in the memory 130.

As another case, as shown in FIG. 5, when identifying whether the first camera 110 includes the first sensing module that senses movement of the first lens module, the controller 150 may transmit the identification information of the first camera 110, which is stored in the memory 130, to the external server, receive the specification information of the first camera 110 from the external server through the communication unit 140, and identify whether the first camera 110 includes the first sensing module, on the basis of the received specification information of the first camera 110.

At this time, the specification information of the first camera 110 and the second camera 120 may previously be stored in the memory 130.

Also, when identifying whether the second camera 120 includes the second sensing module that senses movement of the second lens module, the controller 150 may transmit the identification information of the second camera 120, which is stored in the memory 130, to the external server through the communication unit 140, receive the specification information of the second camera 120 from the external server through the communication unit 140, and identify whether the second camera 120 includes the second sensing module, on the basis of the received specification information of the second camera 120.

Next, if the second camera 120 includes the second sensing module, the controller 150 may identify whether the first sensing module of the first camera 110 and the second sensing module of the second camera 120 have the same types as each other, and control the first camera 110 and the second camera 120 at different time zones if the first sensing module and the second sensing module have the same types as each other.

In this case, as shown in FIG. 4, when identifying whether the first sensing module of the first camera 110 and the second sensing module of the second camera 120 have the same types as each other, the controller 150 may identify the types of the first and second sensing modules on the basis of the specification information of the first and second cameras 110 and 120, which is stored in the memory 130.

Also, as shown in FIG. 5, when identifying whether the first sensing module of the first camera 110 and the second sensing module of the second camera 120 have the same types as each other, the controller 150 may transmit the identification information of the first and second cameras 110 and 120, which is stored in the memory 130, to the external server through the communication unit 140, receive the specification information of the first and second cameras 110 and 120 from the external server through the communication unit 140, and identify the types of the first and second sensing modules on the basis of the received specification information of the first and second cameras 110 and 120.

Next, when identifying whether the first camera 110 includes the first sensing module that senses movement of the first lens module, the controller 150 may drive the first camera 110 and the second camera 120 at the same time if the first camera 110 does not include the first sensing module.

As the case may be, when identifying whether the second camera 120 includes the second sensing module that senses movement of the second lens module, the controller 150 may drive the first camera 110 and the second camera 120 at the same time if the second camera 120 does not include the second sensing module.

As another case, when identifying whether the first sensing module of the first camera 110 and the second sensing module of the second camera 120 have the same types as each other, the controller 150 may drive the first camera 110 and the second camera 120 at the same time if the first sensing module and the second sensing module do not have the same types as each other.

This is because that signal interference does not occur between the first and second cameras if the first sensing module of the first camera 110 and the second sensing module of the second camera 120 do not have the same types as each other.

Figure 6:
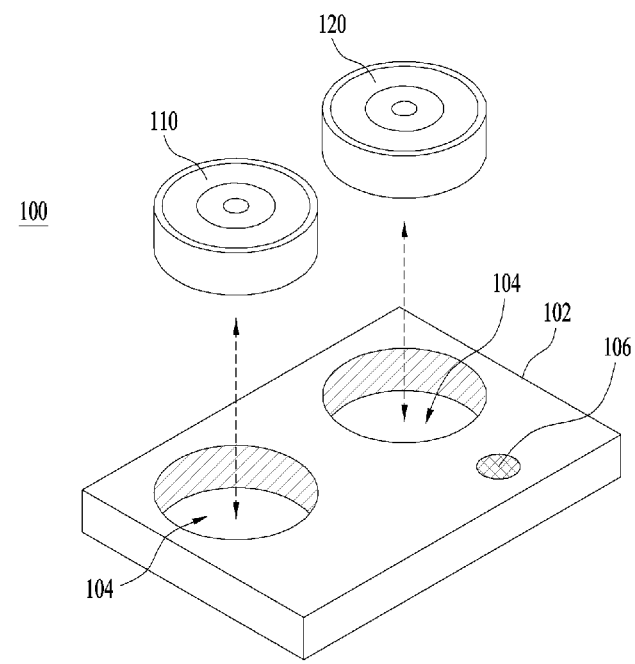
FIGS. 6 to 8 are diagrams illustrating a driving mode of a dual camera module according to the second embodiment of the present invention.
Figure 7:
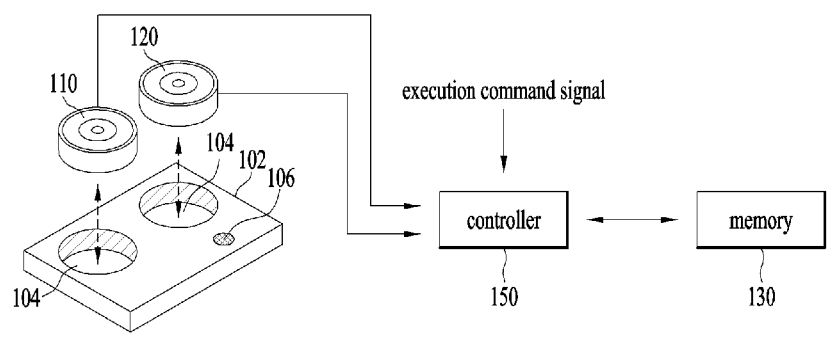
Figure 8:
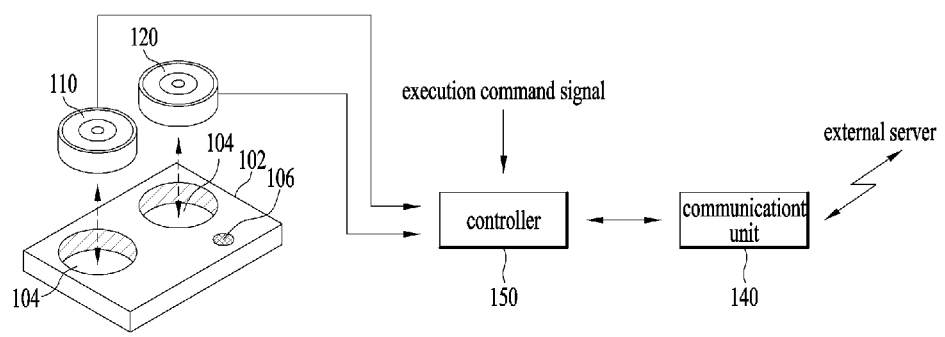

FIGS. 6 to 8 are diagrams illustrating a driving mode of a dual camera module according to the second embodiment of the present invention.

As shown in FIG. 6, the dual camera module according to the second embodiment of the present invention is a detachable type, in which the first and second cameras 110 and 120 are detached from a groove 104 of a body unit 102 or installed in the groove 104 of the body unit 102.

In this case, the body unit 102 of the dual camera module may additionally be provided with a light emitting module 106.

As shown in FIG. 7, in the fixed type dual camera module, if a camera execution command is received, the controller 150 may identify whether the first camera 110 includes the first sensing module that senses movement of the first lens module, and if the first camera 110 includes the first sensing module, may identify whether the second camera 120 includes the second sensing module that senses movement of the second lens module.

In this case, when identifying whether the first camera 110 includes the first sensing module, the controller 150 may receive identification information from the first camera 110, extract specification information of the first camera 110, which corresponds to the received identification information, from the memory 130, and identify whether the first camera 110 includes the first sensing module, on the basis of the extracted specification information of the first camera 110.

At this time, the specification information of the first camera 110 and the second camera 120 may previously be stored in the memory 130.

Also, when identifying whether the second camera 120 includes the second sensing module that senses movement of the second lens module, the controller 150 may receive identification information from the second camera 120, extract specification information of the second camera 120, which corresponds to the received identification information, from the memory 130, and identify whether the second camera 120 includes the second sensing module, on the basis of the extracted specification information of the second camera 120.

As another case, as shown in FIG. 8, when identifying whether the first camera 110 includes the first sensing module that senses movement of the first lens module, the controller 150 may receive the identification information from the first camera 110, transmit the received identification information to the external server through the communication unit 140, receive the specification information of the first camera 110 from the external server, and identify whether the first camera 110 includes the first sensing module, on the basis of the received specification information of the first camera 110.

Also, when identifying whether the second camera 120 includes the second sensing module that senses movement of the second lens module, the controller 150 may receive the identification information from the second camera 120, transmit the received identification information to the external server through the communication unit 140, receive the specification information of the second camera 120 from the external server through the communication unit 140, and identify whether the second camera 120 includes the second sensing module, on the basis of the received specification information of the second camera 120.

Next, if the second camera 120 includes the second sensing module, the controller 150 may identify whether the first sensing module of the first camera 110 and the second sensing module of the second camera 120 have the same types as each other, and control the first camera 110 and the second camera 120 at different time zones if the first sensing module and the second sensing module have the same types as each other.

In this case, as shown in FIG. 7, when identifying whether the first sensing module of the first camera 110 and the second sensing module of the second camera 120 have the same types as each other, the controller 150 may receive the identification information from the first and second cameras 110 and 120, extract the specification information of the first and second cameras 110 and 120, which corresponds to the received identification information, and identify whether the types of the first and second sensing modules are the same as each other, on the basis of the extracted specification information of the first and second cameras 110 and 120.

Also, as shown in FIG. 8, when identifying whether the first sensing module of the first camera 110 and the second sensing module of the second camera 120 have the same types as each other, the controller 150 may receive the identification information from the first and second cameras 110 and 120, transmit the received identification information to the external server through the communication unit 140, receive the specification information of the first and second cameras 110 and 120 from the external server through the communication unit 140, and identify whether the types of the first and second sensing modules are the same as each other, on the basis of the received specification information of the first and second cameras 110 and 120.

Next, when identifying whether the first camera 110 includes the first sensing module that senses movement of the first lens module, the controller 150 may drive the first camera 110 and the second camera 120 at the same time if the first camera 110 does not include the first sensing module.

As the case may be, when identifying whether the second camera 120 includes the second sensing module that senses movement of the second lens module, the controller 150 may drive the first camera 110 and the second camera 120 at the same time if the second camera 120 does not include the second sensing module.

As another case, when identifying whether the first sensing module of the first camera 110 and the second sensing module of the second camera 120 have the same types as each other, the controller 150 may drive the first camera 110 and the second camera 120 at the same time if the first sensing module and the second sensing module do not have the same types as each other.

This is because that signal interference does not occur between the first and second cameras if the first sensing module of the first camera 110 and the second sensing module of the second camera 120 do not have the same types as each other.

Figure 9:
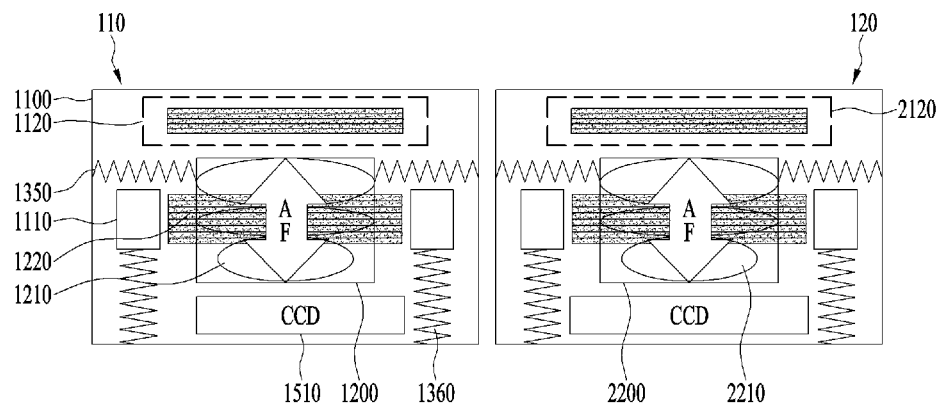
FIGS. 9 and 10 are cross-sectional views illustrating a dual camera module having first and second cameras, which are the same as each other.
Figure 10:
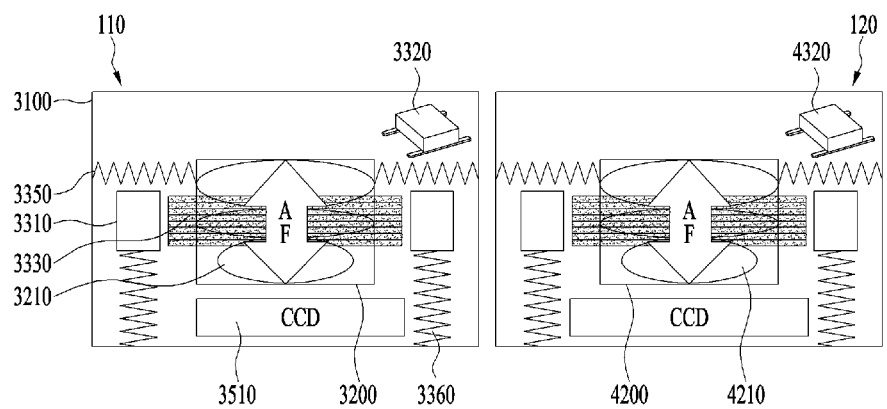

FIGS. 9 and 10 are cross-sectional views illustrating a dual camera module having first and second cameras, which are the same as each other.

As shown in FIGS. 9 and 10, in the dual camera module of the present invention, signal interference may occur during driving if the first and second cameras 110 and 120 are auto-focus cameras having the same sensor.

FIG. 9 illustrates that the first and second cameras 110 and 120 are auto-focus cameras, each of which includes a coil sensor.

As shown in FIG. 9, the first camera 110 may include a fixed module 1100 provided with a through hole, a first lens module 1200 having at least one first lens 1210 and linearly moving within the through hole of the fixed module 1100, a moving coil 1220 surrounding an outer circumference of the lens module 1200, a first coil sensor arranged in the fixed module 1100, receiving a current or voltage varied depending on a distance with the moving coil 1220 from the moving coil 1220, and an image sensor for sensing an image incident through the lens 1210 of the lens module 1200.

The second lens module 2200 that includes at least one second lens 2210 and the second camera 120 that includes a second coil sensor 2120 may have the same structure as that of the first camera 110.

Additionally, the first and second cameras 110 and 120 may include an OIS spring 1360 that compensates for shaking of the first and second lens modules 1200 and 2200.

If the first and second cameras 110 and 120 are auto-focus cameras, each of which includes a coil sensor, the controller of the dual camera module may drive the first camera 110 and the second camera 120 at different time zones.

That is, the controller may alternately drive the first camera 110 and the second camera 120 by performing time-division for a driving time of the first and second cameras 110 and 120.

This is because that signal interference may occur between a magnet 1110 of the second camera 120 and the first coil sensor 1120 of the first camera 110 during driving of the first camera 110 to adversely affect a focus position sensing signal of the first camera 110 and signal interference may occur between the magnet 1110 of the first camera 110 and the second coil sensor 2120 of the second camera 120 during driving of the second camera 120 to adversely affect a focus position sensing signal of the second camera 120.

Therefore, the controller 150 may identify types of sensors that sense focus positions of the first and second cameras 110 and 120, perform driving control of the first and second cameras 110 and 120 at different time zones if the identified types of the sensors are the same as each other, and perform driving control of the first and second cameras 110 and 120 at the same time if the identified types of the sensors are different from each other, whereby signal interference between the two cameras may be minimized to perform an exact and fast auto-focus.

As another example, FIG. 10 illustrates that the first and second cameras 110 and 120 are auto-focus cameras, each of which includes a magnetic sensor.

As shown in FIG. 10, the first camera 110 may include a fixed module 3100 provided with a through hole, a first lens module 3200 having at least one first lens 3210 and linearly moving within the through hole of the fixed module 3100, a moving coil 3330 surrounding an outer circumference of the first lens module 3200, a plurality of magnets 3310 arranged on an inner side of the through hole of the fixed module 3100, a first magnetic sensor 3320 arranged on the inner side of the through hole of the fixed module, sensing a change of a magnetic flux according to movement of the first lens module 3200, a magnetic flux distortion protrusion protruded from the outer circumference of the first lens module 3200, distorting a flow of a magnetic flux according to movement of the first lens module 3200, and an image sensor 3510 for sensing an image incident through the first lens 3210 of the first lens module 3200.

The second lens module 4200 that includes at least one second lens 4210 and the second camera 120 that includes a second magnetic sensor 4320 may have the same structure as that of the first camera 110.

Additionally, the first and second cameras 110 and 120 may include an OIS spring 3360 that compensates for shaking of the first and second lens modules 4200 and 4320.

If the first and second cameras 110 and 120 are auto-focus cameras, each of which includes a magnetic sensor, the controller of the dual camera module may drive the first camera 110 and the second camera 120 at different time zones.

That is, the controller may alternately drive the first camera 110 and the second camera 120 by performing time-division for a driving time of the first and second cameras 110 and 120.

This is because that signal interference may occur between the magnet 3310 of the second camera 120 and the first magnetic sensor 3320 of the first camera 110 during driving of the first camera 110 to adversely affect a focus position sensing signal of the first camera 110 and signal interference may occur between the magnet 3310 of the first camera 110 and the second magnetic sensor 4320 of the second camera 120 during driving of the second camera 120 to adversely affect a focus position sensing signal of the second camera 120.

Therefore, the controller 150 may identify types of sensors that sense focus positions of the first and second cameras 110 and 120, perform driving control of the first and second cameras 110 and 120 at different time zones if the identified types of the sensors are the same as each other, and perform driving control of the first and second cameras 110 and 120 at the same time if the identified types of the sensors are different from each other, whereby signal interference between the two cameras may be minimized to perform an exact and fast auto-focus.

Figure 11:
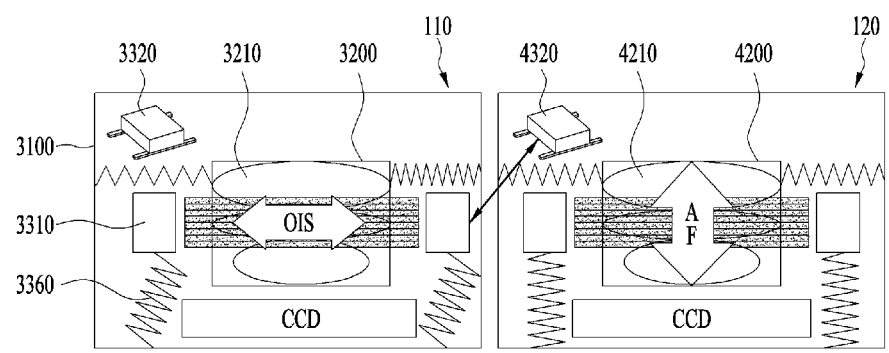
FIGS. 11 and 12 are cross-sectional views illustrating signal interference between first and second cameras.
Figure 12:
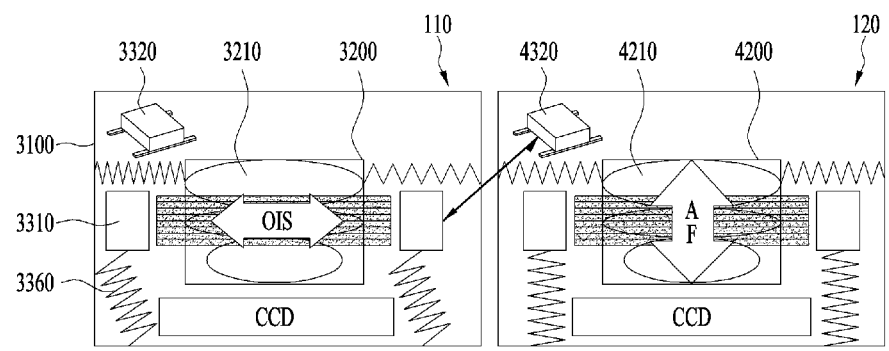

FIGS. 11 and 12 are cross-sectional views illustrating signal interference between first and second cameras.

As shown in FIGS. 11 and 12, if the first and second cameras 110 and 120 are auto-focus cameras having the same sensor, signal reception of the sensor 4320 may be affected by movement of the magnet 3310 of the first camera 110 or the second camera 120.

Since the magnet 3310 of the camera is connected to the OIS spring 3360, the magnet 3310 may move in accordance with shaking of the camera.

In this case, as shown in FIG. 11, if the magnet 3310 of the first camera 110 moves and thus becomes close to the second magnetic sensor 4320 of the second camera 120, an error may occur in the sensing signal due to a magnetic force change of the magnet 3310 when the second magnetic sensor 4320 senses movement of the second lens module 4200, whereby movement of the second lens module 4200 cannot be measured exactly.

Also, as shown in FIG. 12, if the magnet 3310 of the first camera 110 moves and thus becomes far away from the second magnetic sensor 4320 of the second camera 120, an error may occur in the sensing signal due to a magnetic force change of the magnet 3310 when the second magnetic sensor 4320 senses movement of the second lens module 4200, whereby movement of the second lens module 4200 cannot be measured exactly.

Therefore, in the present invention, if the first and second cameras having the same sensor are provided, driving control of the first and second cameras 110 and 120 may be performed at different time zones, whereby an auto-focus error caused by signal interference may be removed. The first and second cameras having their respective sensors different from each other may be provided to cancel signal interference, whereby driving control of the first and second cameras 110 and 120 may be performed at the same time and thus exact and fast auto-focus may be performed.

Figure 13:
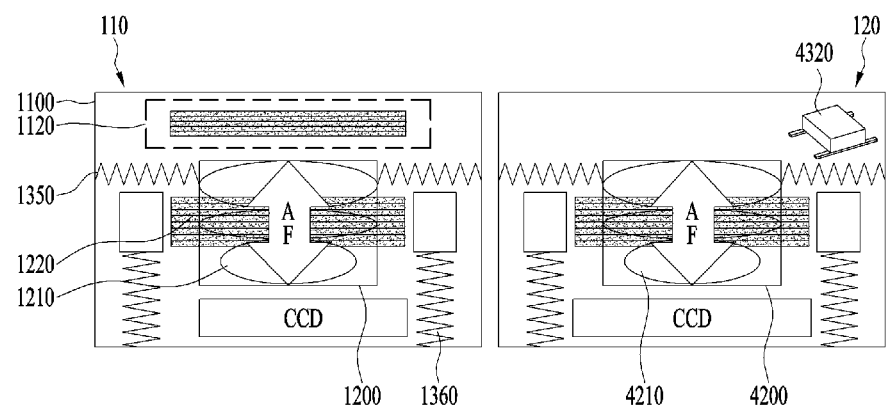
FIG. 13 is a cross-sectional view illustrating a dual camera module having first and second cameras, which are different from each other.

FIG. 13 is a cross-sectional view illustrating a dual camera module having first and second cameras, which are different from each other.

As shown in FIG. 13, the dual camera module of the present invention may minimize signal interference during driving if the first and second cameras 110 and 120 are auto-focus cameras having their respective sensors different from each other.

In this case, the first camera 110 is an auto-focus camera having a coil sensor, and the second camera 120 is an auto-focus camera having a magnetic sensor.

For example, the first camera 110 may include a first coil sensor 1120 for receiving a current or voltage varied depending on a distance with the moving coil 1220 of the first lens module 1200 from the moving coil 1220, and the second camera 120 may include a magnetic sensor 4320 for sensing a change of a magnetic flux according to movement of the second lens module 4200.

Since signal interference is minimized between the first and second cameras 110 and 120 having their respective sensors different from each other even though the first and second cameras are driven at the same time, exact and fast auto-focus may be performed.

FIGS. 14 to 19 are cross-sectional views illustrating a camera applicable to a dual camera module of the present invention.

As shown in FIGS. 14 to 19, a camera selected from a fixed focus camera, a fixed focus camera that includes OIS spring, an auto-focus camera that includes a coil sensor, an auto-focus camera that includes a coil sensor and OIS spring, an auto-focus camera that includes a magnetic sensor, and an auto-focus camera that includes a magnetic sensor and OIS spring may be applied to the dual camera module of the present invention.

For example, the dual camera module may include a first type in which the first and second cameras are fixed focus cameras, a second type in which the first camera is a fixed focus camera and the second camera is a fixed focus camera that includes OIS spring, a third type in which the first camera is a fixed focus camera and the second camera is an auto-focus camera, a fourth type in which the first camera is a fixed focus camera that includes OIS spring and the second camera is an auto-focus camera, a fifth type in which the first and second cameras are auto-focus cameras, a sixth type in which the first camera is an auto-focus camera that includes OIS spring and the second camera is an auto-focus camera, a seventh type in which the first camera is a fixed focus camera and the second camera is an auto-focus camera that includes OIS spring, an eighth type in which the first camera is a fixed focus camera that includes OIS spring and the second camera is an auto-focus camera that includes OIS spring, a ninth type in which the first camera is an auto-focus camera and the second camera is an auto-focus camera that includes OIS spring, and a tenth type in which the first camera is an auto-focus camera that includes OIS spring and the second camera is an auto-focus camera that includes OIS spring.

Figure 14:
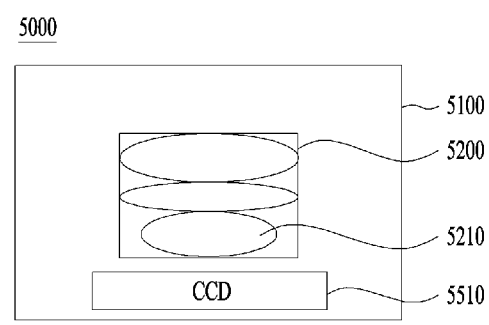
FIGS. 14 to 19 are cross-sectional views illustrating a camera applicable to a dual camera module of the present invention.

As shown in FIG. 14, the fixed focus camera 5000 may include a fixed module 5100 provided with a through hole, a lens module 5200 having at least one lens 5120, fixed within the through hole of the fixed module 5100, and an image sensor 5510 for sensing an image incident through the lens 5120 of the lens module 5200.

Figure 15:
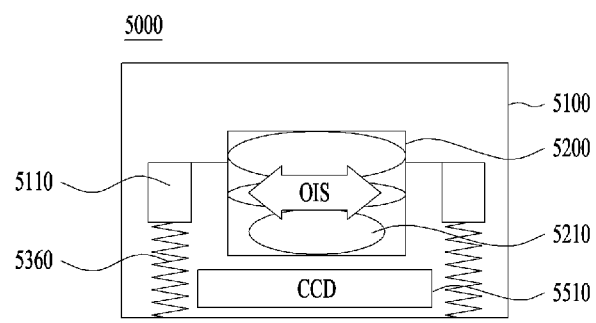

Also, as shown in FIG. 15, the fixed focus camera 5000 may further include an OIS spring 5360 that compensates for shaking of the lens module.

Figure 16:
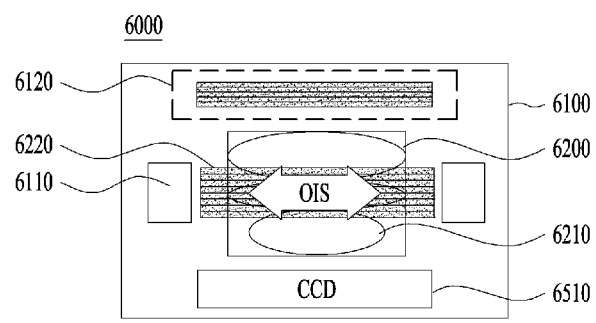

As shown in FIG. 16, the auto-focus camera 6000 that includes a coil sensor may include a fixed module 6100 provided with a through hole, a lens module 5200 having at least one lens 6210 and linearly moving within the through hole of the fixed module 6100, a moving coil 6220 surrounding an outer circumference of the lens module 6200, a coil sensor 6120 arranged in the fixed module, receiving a current or voltage varied depending on a distance with the moving coil 6220, and an image sensor 6510 for sensing an image incident through the lens 6210 of the lens module 6200.

Figure 17:
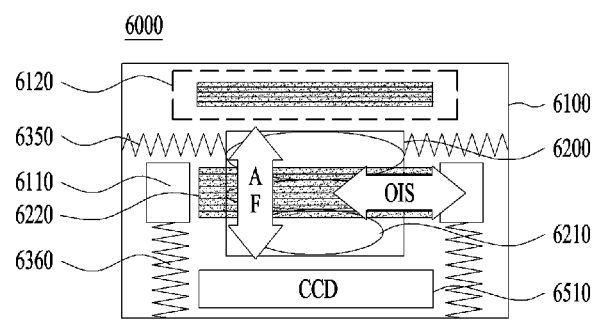

Also, as shown in FIG. 17, the auto-focus camera 6000 that includes a coil sensor may further include an OIS spring 6360 that compensates for shaking of the lens module 6200.

Figure 18:
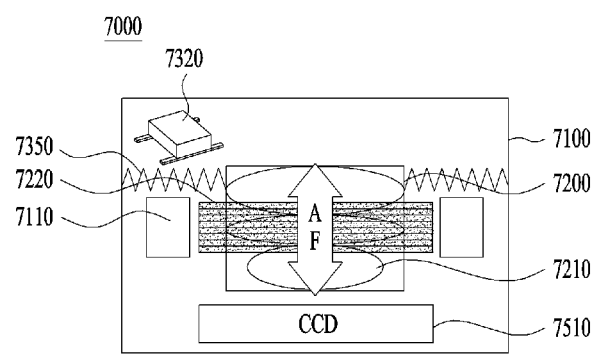

As shown in FIG. 18, the auto-focus camera 7000 that includes a magnetic sensor may include a fixed module 7100 provided with a through hole, a lens module 7200 having at least one lens 7210 and linearly moving within the through hole of the fixed module 7100, a moving coil 7220 surrounding an outer circumference of the lens module 7200, a plurality of magnets 7110 arranged on an inner side of the through hole of the fixed module 7100, a magnetic sensor 7320 arranged on the inner side of the through hole of the fixed module 7100, sensing a change of a magnetic flux according to movement of the lens module 7200, a magnetic flux distortion protrusion protruded from the outer circumference of the lens module 7200, distorting a flow of a magnetic flux according to movement of the lens module 7200, and an image sensor 7510 for sensing an image incident through the lens 7210 of the lens module 7200.

Figure 19:
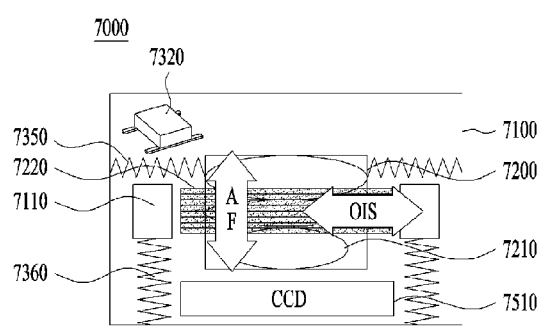

Also, as shown in FIG. 19, the auto-focus camera 7000 that includes a magnetic sensor may further include an OIS spring 7360 that compensates for shaking of the lens module 7200.

Figure 20:
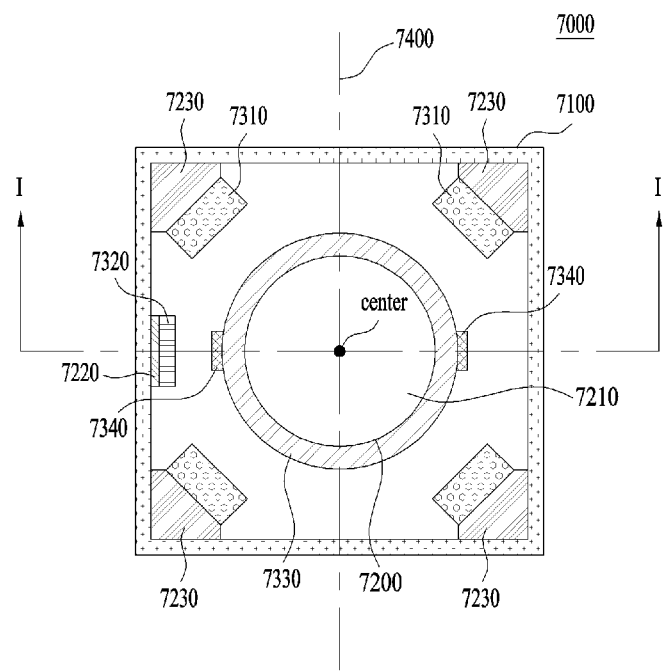
FIGS. 20 and 21 are diagrams illustrating a configuration of an auto-focus camera that includes a magnetic sensor.
Figure 21:
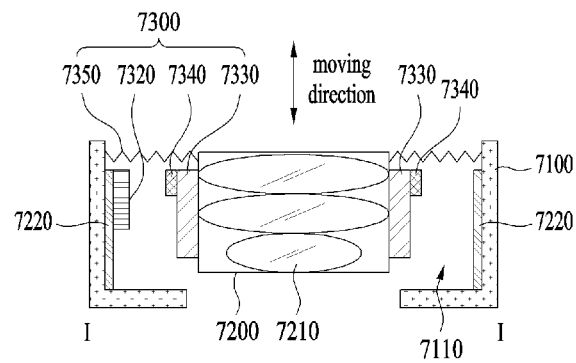

FIGS. 20 and 21 are diagrams illustrating a configuration of an auto-focus camera that includes a magnetic sensor, wherein FIG. 20 is a plane view and FIG. 21 is a sectional view taken along line I-I.

As shown in FIGS. 20 and 21, the auto-focus camera of the present invention may include a fixed module 7100, a lens module 7200, and a driving module 7300.

In this case, the fixed module 7100 may be provided with a through hole 7110 at a center area.

The lens module 720 may include at least one lens 7210, and may linearly move within the through hole 7110 of the fixed module 7100.

In this case, the lens module 7200 may be a lens module that includes lenses 7210.

Subsequently, the driving module 7300 may drive the lens module 7200 to linearly move upwardly and downwardly.

In this case, the driving module 7300 is an actuator for moving the lens module 7200, and may include a plurality of magnets 7310, a magnetic sensor 7320, a coil 7330, and a magnetic flux distortion protrusion 7340.

At this time, the plurality of magnets 7310 may be arranged on the inner side of the through hole 7110 of the fixed module 7100.

For example, the plurality of magnets 7310 may be arranged at the same interval, but may be arranged at different intervals as the case may be.

The plurality of magnets 7310 may be arranged symmetrically to a coordinate axis 7400 that passes through the center of the through hole 7110 of the fixed module 7100. This is because that the change of the magnetic flux according to movement of the lens module 7200 may be sensed stably without external impact.

As the case may be, the magnets 7310 adjacent to each other may be arranged to be spaced part from each other at a first interval, and may be arranged to be spaced apart from the coil 7330 at a second interval.

In this case, the first interval may be longer than the second interval.

Also, the plurality of magnets 7310 may be supported respectively by magnet supports 7230 protruded from the inner side of the through hole 7110.

Next, the magnetic sensor 7320 may be arranged on the inner side of the through hole 7110 of the fixed module 7100 to sense the change of the magnetic flux according to movement of the lens module 7200.

In this case, the magnetic sensor 7320 may be arranged between the magnets 7310 adjacent to each other.

At this time, the magnetic sensor 7320 may be at least one of a hall sensor, a magnetic resistance sensor and a search coil sensor.

The magnetic sensor 7320 may be supported by a sensor support 7220 protruded from the inner side of the through hole 7110.

In this case, the sensor support 7220 may be arranged symmetrically to the coordinate axis 7400 that passes through the center of the through hole 7110 of the fixed module 7100. This is because that the change of the magnetic flux according to movement of the lens module 7200 may be sensed stably without external impact.

Next, the coil 7330 may be arranged to surround the outer circumference of the lens module 7200 and move together with the lens module 7200.

Subsequently, the magnetic flux distortion protrusion 7340 may be protruded from the outer circumference of the lens module 7200 to distort a flow of the magnetic flux according to movement of the lens module 7200.

In this case, the magnetic flux distortion protrusion 7340 may be arranged to face the magnetic sensor 7320.

At this time, the magnetic flux distortion protrusion 7340 and the magnetic sensor 7320 may be arranged to be spaced apart from each other at a certain interval. For example, the interval between the magnetic flux distortion protrusion 7340 and the magnetic sensor 7320 may be 0.05 mm to 0.5 mm, approximately.

The magnetic flux distortion protrusion 7340 may be arranged at, but not limited to, an edge area of the lens module 7200.

As the case may be, the magnetic flux distortion protrusion 7340 may be arranged on the coil 7330.

Subsequently, the magnetic flux distortion protrusion 7340 may be arranged symmetrically to the coordinate axis 7400 that passes through the center of the through hole 7110 of the fixed module 7100. This is because that the change of the magnetic flux according to movement of the lens module 7200 may be sensed stably without external impact.

Also, the driving module 7300 is connected between the fixed module 7100 and the lens module 7200, and may include a spring 7350 that provides an elastic force according to movement of the lens module 7200.

A damper (not shown) may be arranged between the spring 7350 and the fixed module 7100.

In this case, the damper may be arranged to adjoin a connection terminal between the spring 7350 and the fixed module 7100.

At this time, the damper is formed to suppress natural frequency of the spring 7350, and may prevent an auto-focus error by reducing hysteresis property.

Also, the auto-focus camera that includes a magnetic sensor may further include an auto-focusing controller that controls auto-focusing of the lens module. The auto-focusing controller may further include an image sensor, an image signal processor, a focus position calculator, and a driving controller.

In this case, the image sensor senses the image incident through the lens 7210, and the image signal processor processes the image signal sensed from the image sensor.

The focus position calculator may calculate an optimal focus position value by receiving the image signal processed from the image signal processor and the change value of the magnetic flux according to movement of the lens module 7200, which is sensed from the magnetic sensor 7320 arranged in the fixed module 7100.

Subsequently, the driving controller may control the driving module to allow the lens module 7200 to move to the calculated optimal focus position value.

Figure 22:
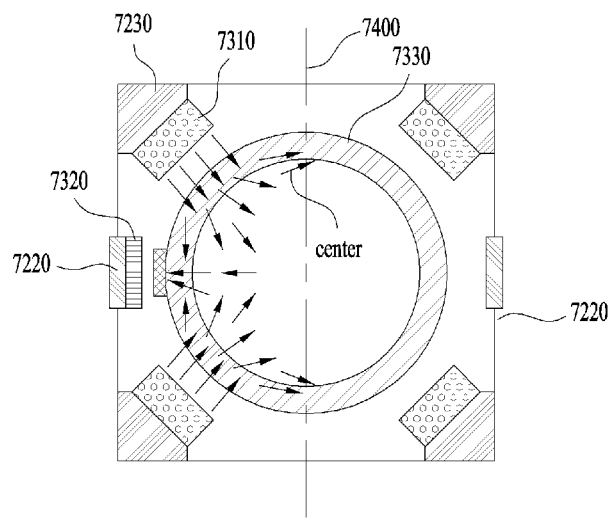
FIG. 22 is a diagram illustrating a driving principle of an auto-focus camera that includes a magnetic sensor.

FIG. 22 is a diagram illustrating a driving principle of an auto-focus camera that includes a magnetic sensor.

As shown in FIG. 22, the plurality of magnets 7310 are supported respectively by the magnet supports 7230 may be arranged to surround the coil 7330, and the coil 7330 from which the magnetic flux distortion protrusion 7340 is protruded may move upwardly or downwardly by means of the lens module.

The magnetic sensor 7320 supported by the sensor support 7220 may be arranged to face the magnetic flux distortion protrusion 7340, thereby sensing the change of the magnetic flux.

In this case, a change occurs in a flow of the magnetic flux in accordance with movement of the coil 7330, and distortion is added to the flow of the magnetic flux due to the magnetic flux distortion protrusion 7340 protruded from the coil 7330, whereby a big change occurs in the flow of the magnetic flux.

Therefore, the magnetic sensor 7320 may exactly identify the moving position of the lens module by sensing the change for the flow of the magnetic flux.

That is, the magnetic flux distortion protrusion 7340 may exactly identify the moving position of the lens module through the signal sensed from the magnetic sensor 7320 by serving to amplify the change of the magnetic flux according to movement of the lens module.

Figure 23:
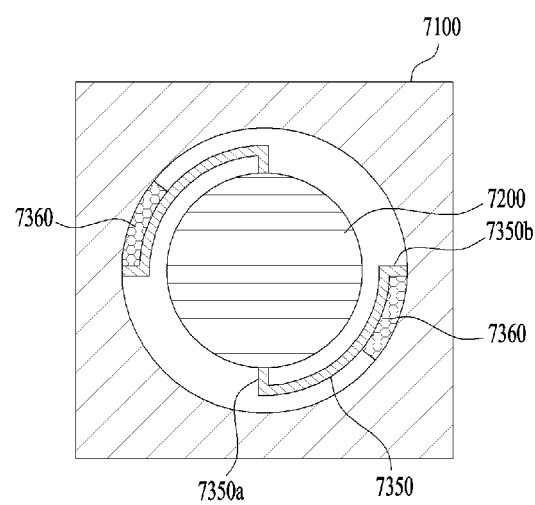
FIG. 23 is a plane view illustrating a spring of FIG. 21.

FIG. 23 is a plane view illustrating a spring of FIG. 21.

As shown in FIG. 23, the spring 7350 may be connected between the fixed module 7100 and the lens module 7200 to provide an elastic force according to movement of the lens module 7200.

In this case, the spring 7350 may include a first connector 7350a connected to the lens module 7200 and a second connector 7350b connected to the fixed module 7100.

Generally, the spring 7350 has natural frequency, and due to the natural frequency of the spring, time loss of the lens module 7200 may occur because the lens module 7200 should wait for a predetermined time until stabilization after movement.

Therefore, a damper 7360 may be arranged between the spring 7350 and the fixed module 7100 to suppress natural frequency of the spring.

In this case, the damper 7360 may be arranged on all areas between the spring 7350 and the fixed module 7100.

For example, the damper 7360 may be arranged to adjoin the second connector 7350b that connects the spring 7350 with the fixed module 7100.

Therefore, the damper may be formed between the spring 7350 and the fixed module 7100 to suppress natural frequency of the spring 7350 and reduce hysteresis property, whereby an auto-focus error may be avoided and auto-focus time may be reduced.

Figure 24:
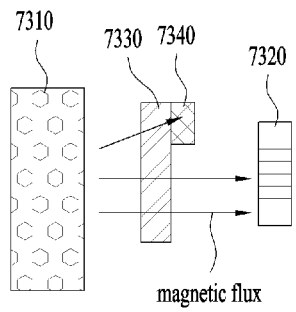
FIGS. 24 to 26 are diagrams illustrating a change of a magnetic flux according to coil movement of FIG. 22.
Figure 25:
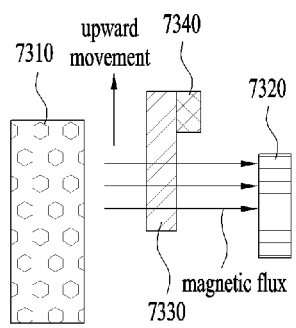
Figure 26:
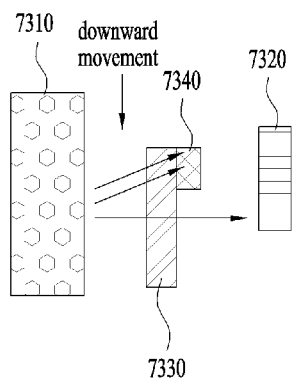

FIGS. 24 to 26 are diagrams illustrating a change of a magnetic flux according to coil movement of FIG. 22. For convenience of description, the coil of FIG. 22, which is rotated at 90 degrees, is shown.

First of all, as shown in FIG. 24, if the coil 7330 that includes the magnetic flux distortion protrusion 7340 is positioned at a center area, a part of the magnetic flux generated from the magnet 7310 is headed for the magnetic sensor 7320 through the coil 7330 and the other part of the magnetic flux is distorted by the magnetic flux distortion protrusion 7340 and then headed for the magnetic flux distortion protrusion 7340 instead of the magnetic sensor 7320.

In this case, the amount of the magnetic flux headed for the magnetic sensor 7320 may be greater than that of the magnetic flux headed for the magnetic flux distortion protrusion 7340, and the magnetic sensor 7320 may sense the amount of such a change of the magnetic flux.

Subsequently, as shown in FIG. 25, if the coil 7330 that includes the magnetic flux distortion protrusion 7340 moves upwardly, the magnetic flux generated from the magnet 7310 is headed for the magnetic sensor 7320 through the coil 7330.

In this case, the amount of the magnetic flux headed for the magnetic sensor 7320 may be more increased than that of FIG. 24, and the magnetic sensor 7320 may sense the amount of such a change of the magnetic flux.

Next, as shown in FIG. 26, if the coil 7330 that includes the magnetic flux distortion protrusion 7340 moves downwardly, a part of the magnetic flux generated from the magnet 7310 is headed for the magnetic sensor 7320 through the coil 7330 and the other part of the magnetic flux is distorted by the magnetic flux distortion protrusion 7340 and then headed for the magnetic flux distortion protrusion 7340 instead of the magnetic sensor 7320.

In this case, the amount of the magnetic flux headed for the magnetic sensor 7320 may be smaller than that of the magnetic flux headed for the magnetic flux distortion protrusion 7340, and the magnetic sensor 7320 may sense the amount of such a change of the magnetic flux.

Figure 27:
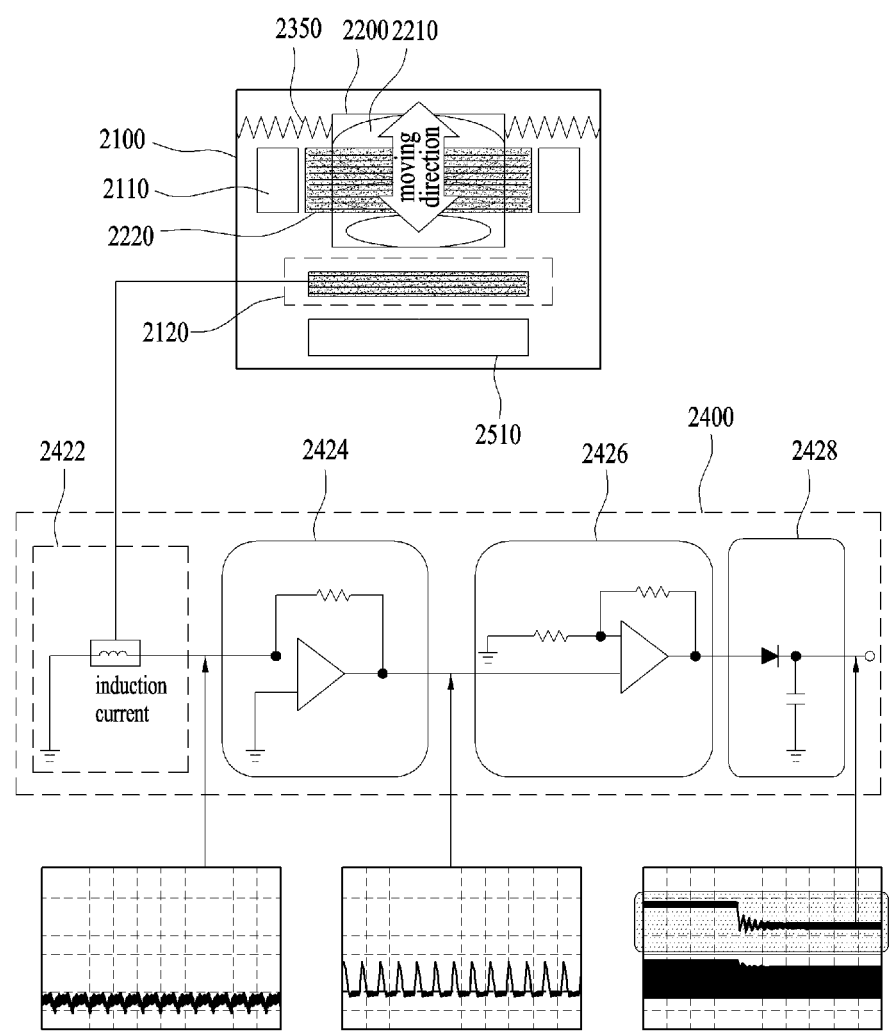
FIG. 27 is a diagram illustrating a configuration of an auto-focus camera that includes a coil sensor.

FIG. 27 is a diagram illustrating a configuration of an auto-focus camera that includes a coil sensor.

As shown in FIG. 27, the auto-focus camera that includes a coil sensor may include a fixed module 2100 provided with a magnet 2110 and a coil sensor 1220, and a lens module 2200 provided with a lens 2210 and a moving coil 2220.

In this case, the fixed module 2100 may be a holder provided with a through hole formed at a center area.

At this time, the magnet 2110 may be arranged on an inner side of the through hole of the fixed module 2100.

For example, one magnet 2110 may be provided, or a plurality of magnets 2110 may be provided as the case may be.

If the plurality of magnets 2110 are provided, the plurality of magnets 2110 may be arranged at the same interval, or may be arranged at different intervals as the case may be.

The plurality of magnets 2110 may be arranged symmetrically to a coordinate axis that passes through the center of the through hole of the fixed module 2100. This is because that a displacement value of a current or voltage according to movement of the lens module 2200 may be sensed stably without external impact.

The lens module 2200 may include at least one lens 2210, and may linearly move within the through hole of the fixed module 2100.

Subsequently, the moving coil 2220 may be arranged to surround the outer circumference of the lens module 2200 and move together with the lens module 2200.

In this case, the moving coil 2220 and the magnet 2110 are actuators for moving the lens module 2200, and may drive the lens module 2200 to allow the lens module 2200 to linearly move upwardly and downwardly.

Next, the coil sensor 2120 may be arranged in the fixed module 2100, and may receive the current or voltage varied depending on the distance with the moving coil 2220 from the moving coil 2220.

In this case, the coil sensor 2120 may be arranged to be spaced apart from one side of the lens module 2100 at a certain interval, and may be located along a moving direction of the lens module 2100.

Therefore, in the coil sensor 2120 and the moving coil 2220, the current or voltage may be induced from the moving coil 2220 to the coil sensor 2120 by means of electromagnetic induction.

At this time, the induced current or voltage value may be varied depending on the distance between the coil sensor 2120 and the moving coil 2220.

That is, the current or voltage value induced to the coil sensor 2120 is varied depending on a vertical distance between the coil sensor 2120 and the moving coil 2220, and a position value of the lens module 2200 may be predicted using this displacement value.

An optimal auto-focus position value may be discovered using the predicted position value of the lens module, and movement of the lens module 2200 may be controlled such that the actual position value of the lens module may move to the optimal auto-focus position value.

Also, the coil sensor 2120 is located in a linear moving direction of the lens module 2200. In this case, the coil sensor 2120 may be arranged below or above the lens module 2200.

In this case, the coil sensor 2120 should be arranged such that a minimum interval between the coil sensor 2120 and the moving coil 2220 is maintained at 0 or more when the lens module 2200 linearly moves.

This is because that the displacement value of the current or voltage according to the distance may not be detected exactly as the current or voltage received in the coil sensor 2120 is changed from a positive value to a negative value or vice versa if the minimum interval between the coil sensor 2120 and the moving coil 2220 is smaller than 0.

Also, if the interval between the coil sensor 2120 and the moving coil 2220 becomes short, since a change rate of the current or voltage according to the distance is reduced, non-linearity of an induction signal received in the coil sensor 2120 is increased, whereby the displacement value of the current or voltage according to the distance may not be detected exactly.

That is, if the coil sensor 2120 and the moving coil 2220 are mechanically overlapped with each other, linearity of the induction signal received in the coil sensor 2120 is degraded, and a sign of the induction signal is inversed, whereby an auto-focus error may occur.

The coil sensor 2120 may be arranged along the circumference of at least one of an upper surface and a lower surface of the holder of the fixed module 2100 and an outer surface between the upper surface and the lower surface.

Also, the number of winding times of the coil sensor 2120 may be smaller than the number of winding times of the moving coil 2220. This is because that the whole size of the camera module may be reduced and a frequency signal for the current or voltage induced to the coil sensor 2120 may be amplified.

As the case may be, the number of winding times of the coil sensor 2120 may be the same as the number of winding times of the moving coil 2220.

The moving coil 2220 may receive a driving signal that includes a high frequency signal carried in a low frequency signal, and may transmit the driving signal to the coil sensor 2120.

That is, the driving signal applied to the moving coil 2220 of the lens module 2200 may be a signal in which a random high frequency signal is synthesized to a low frequency driving signal.

Therefore, the coil sensor 2120 may receive a frequency signal for the current or voltage induced from the moving coil 2220 by means of electromagnetic induction, wherein the received frequency signal may be a signal in which the high frequency signal is synthesized to the low frequency signal.

In this case, the reason why that the driving signal in which the high frequency signal is synthesized to the low frequency signal is applied to the moving coil 2220 is that the displacement value of the current or voltage may be detected easily by amplifying the frequency signal for the current or voltage induced to the coil sensor 2120.

That is, the low frequency signal is a signal component for moving the lens module 2200, and the high frequency signal synthesized to the driving signal is a signal component for sensing a moving position of the lens module 2200 and may be a frequency signal higher than the driving signal.

For example, the high frequency signal synthesized to the driving signal may be, but not limited to, 100 kHZ to 5 MHz.

Also, the auto-focus camera that includes a coil sensor is connected between the fixed module 2100 and the lens module 2200, and may include a spring 2350 that provides an elastic force according to movement of the lens module 2200.

A damper (not shown) may be arranged between the spring 2350 and the fixed module 2100.

In this case, the damper may be arranged to adjoin a connection terminal between the spring 2350 and the fixed module 2100.

At this time, the damper is formed to suppress natural frequency of the spring 2350, and may prevent an auto-focus error by reducing hysteresis property.

Also, the auto-focus camera that includes a coil sensor may further include a detector 2400 that detects a displacement value of a current or voltage received from a fixed coil 2120.

In this case, the detector 2400 may include a half-wave rectifier 2422 for rectifying a frequency signal for the current or voltage received from the fixed coil 2120 to a half-wave signal, a converter 2424 for converting the half-wave signal received from the half-wave rectifier 2422 to the current or voltage, an amplifier 2426 for amplifying the frequency signal for the current or voltage converted from the converter 2424, and a peak detector 2428 for detecting a peak of the frequency signal amplified from the amplifier 2426.

Also, the auto-focus camera that includes a coil sensor may further include an auto-focusing controller that controls auto-focusing of the lens module 2200. The auto-focusing controller may further include an image sensor 2510, an image signal processor, a focus position calculator, and a driving controller.

In this case, the image sensor 2510 may sense the image incident through the lens 2210.

The image signal processor (not shown) may process the image signal sensed from the image sensor 2510.

Next, the focus position calculator (not shown) may calculate an optimal focus position value on the basis of the image signal processed from the image signal processor and the displacement value of the current or voltage received from the fixed coil arranged in the fixed module.

Subsequently, the driving controller (not shown) may control movement of a driving module to the calculated optimal focus position value.

As described above, the auto-focus camera that includes a coil sensor may discover the auto-focus position quickly and exactly by arranging the coil sensor in the fixed module, arranging the moving coil in the lens module, and detecting the displacement value of the current or voltage according to the distance between the coil sensor and the moving coil.

Figure 28:
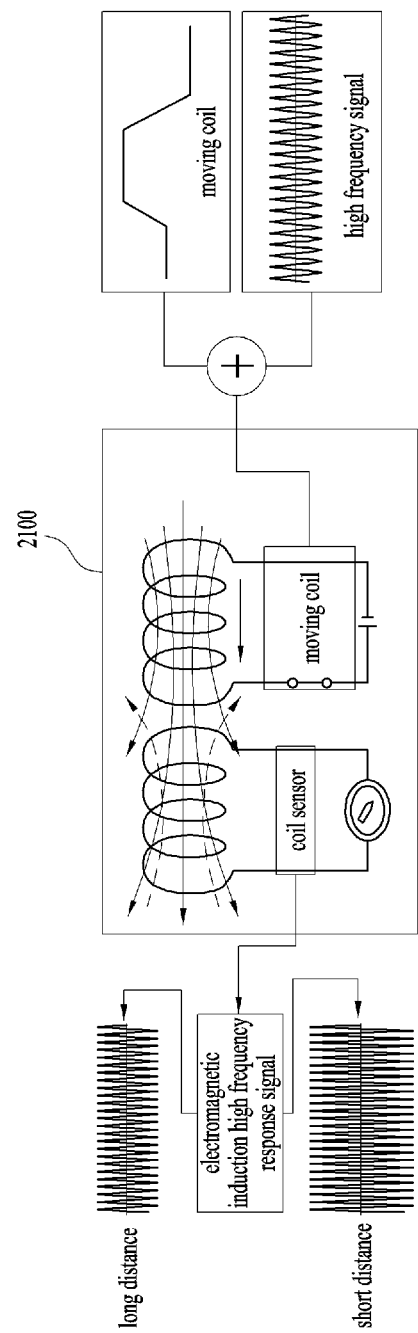
FIG. 28 is a diagram illustrating electromagnetic induction between a coil sensor and a moving coil of FIG. 27.

FIG. 28 is a diagram illustrating electromagnetic induction between a coil sensor and a moving coil of FIG. 27.

As shown in FIG. 28, the coil sensor receives a frequency signal for the current or voltage induced from the moving coil by means of electromagnetic induction, wherein the received frequency signal may be a signal in which the high frequency signal is synthesized to the low frequency signal.

In this case, the reason why that the driving signal in which the high frequency signal is synthesized to the low frequency signal is applied to the moving coil is that the displacement value of the current or voltage may be detected easily by amplifying the frequency signal for the current or voltage induced to the coil sensor.

That is, the low frequency signal of the driving signal is a signal component for moving the lens module, and the high frequency signal synthesized to the driving signal is a signal component for sensing a moving position of the lens module and may be a frequency signal higher than the driving signal.

For example, the high frequency signal synthesized to the driving signal may be, but not limited to, 100 kHZ to 5 MHz.

Therefore, the electromagnetic induction high frequency response signal received in the coil sensor becomes smaller if the distance between the coil sensor and the moving coil becomes long, and becomes greater if the distance between the coil sensor and the moving coil becomes short.

As described above, the since the electromagnetic induction high frequency response signal received in the coil sensor is varied depending on the distance between the coil sensor and the moving coil, the detector may detect the displacement value of the current or voltage received in the fixed coil, and the auto-focusing controller may predict the position value of the lens module by using this displacement value.

The auto-focusing controller may discover the optimal auto-focus position value by using the predicted position value of the lens module, and may control movement of the lens module such that the actual position value of the lens module may move to the optimal auto-focus position value.

Figure 29:
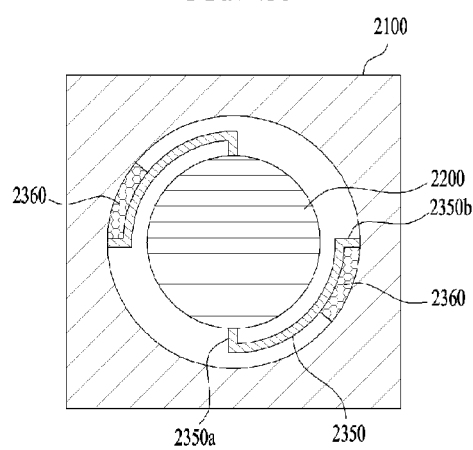
FIG. 29 is a plane view illustrating a spring of FIG. 27.

FIG. 29 is a plane view illustrating a spring of FIG. 27.

As shown in FIG. 29, the spring 2350 may be connected between the fixed module 2100 and the lens module 2200 to provide an elastic force according to movement of the lens module 2200.

In this case, the spring 2350 may include a first connector 2350*a* connected to the lens module 2200 and a second connector 2350*b* connected to the fixed module 2100.

Generally, the spring 2350 has natural frequency, and due to the natural frequency of the spring, time loss of the lens module 2200 may occur because the lens module 2200 should wait for a predetermined time until stabilization after movement.

Therefore, a damper 2360 may be arranged between the spring 2350 and the fixed module 2100 to suppress natural frequency of the spring.

In this case, the damper 2360 may be arranged on all areas between the spring 2350 and the fixed module 2100.

For example, the damper 2360 may be arranged to adjoin the second connector 2350b that connects the spring 2350 with the fixed module 2100.

Therefore, the damper may be formed between the spring 2350 and the fixed module 2100 to suppress natural frequency of the spring 2350 and reduce hysteresis property, whereby an auto-focus error may be avoided and auto-focus time may be reduced.

Figure 30:
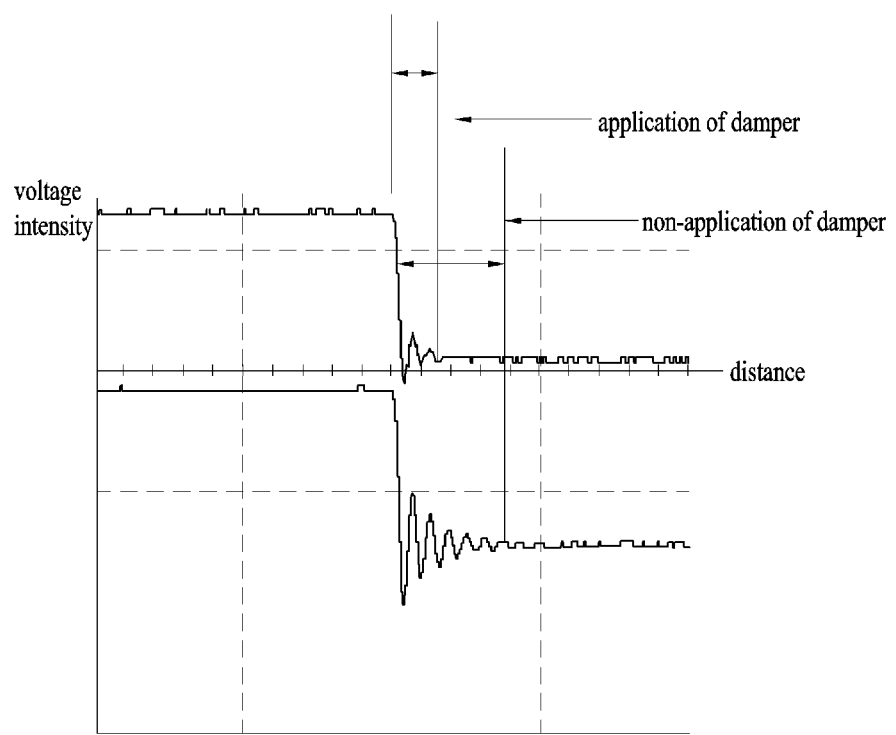
FIG. 30 is a graph illustrating natural frequency characteristics of a spring before and after a damper is applied to the spring.

FIG. 30 is a graph illustrating natural frequency characteristics of a spring before and after a damper is applied to the spring.

As shown in FIG. 30, if the damper is not applied to the spring, since a long time is required to stabilize the lens module after movement of the lens module, unnecessary time loss may occur.

However, if the damper is applied to the spring, since the lens module is stabilized within a short time after movement, unnecessary time loss required to stabilize the lens module may be removed.

Therefore, according to the present invention, as the damper is applied to the spring, natural frequency of the spring may be suppressed and hysteresis property may be reduced, whereby the auto-focus error may be avoided and the auto-focus time may be reduced.

Figure 31:
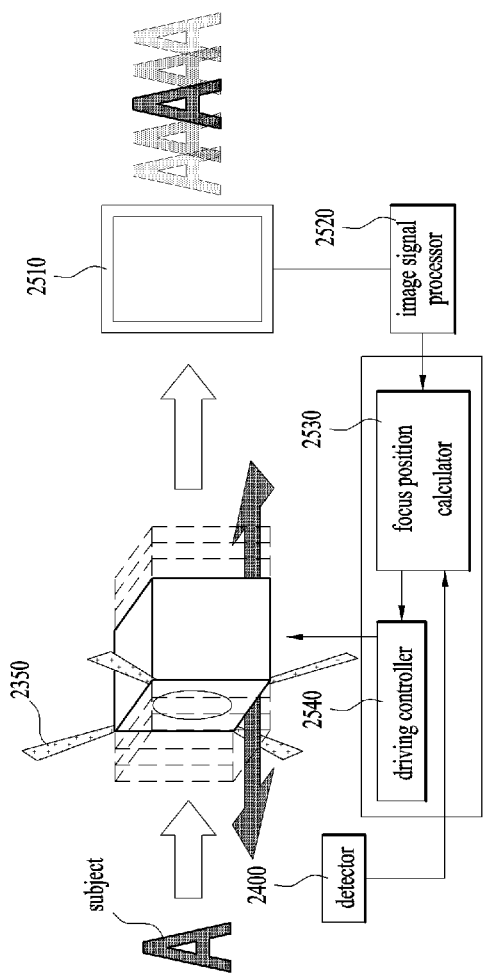
FIG. 31 is a block schematic diagram illustrating an auto-focusing controller of an auto-focus camera that includes a coil sensor.

FIG. 31 is a block schematic diagram illustrating an auto-focusing controller of an auto-focus camera that includes a coil sensor.

As shown in FIG. 31, the auto-focus camera that includes a coil sensor may include an auto-focusing controller that controls auto-focusing of the lens module. The auto-focusing controller may further include an image sensor 2510, an image signal processor 2520, a focus position calculator 2530, and a driving controller 2540.

In this case, the image sensor 2510 senses an image of a subject incident through a lens of the lens module fixed to the fixed module by the spring 2350 and then auto-focused.

The image signal processor 2520 processes the image signal sensed from the image sensor 2510.

Subsequently, the focus position calculator 2530 may calculate an optimal focus position value by receiving the image signal processed from the image signal processor 2520 and the displacement value of the current or voltage according to the distance between the moving coil and the coil sensor, which is detected from the detector 2400.

Next, the driving controller 2540 may control a driving module to allow the lens module to move to the calculated optimal focus position value.

Figure 32:
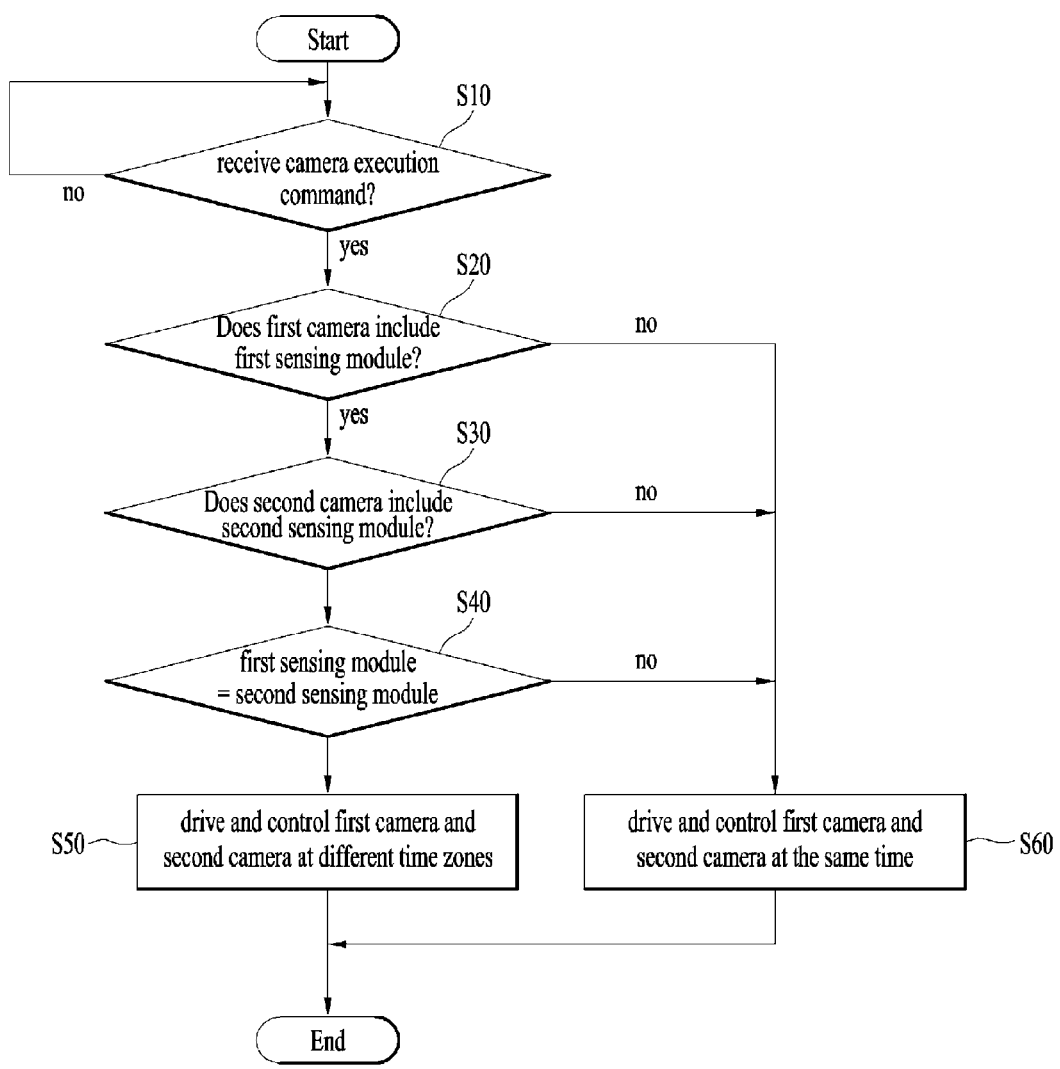
FIG. 32 is a flow chart illustrating a method for controlling a dual camera module according to the present invention.

FIG. 32 is a flow chart illustrating a method for controlling a dual camera module according to the present invention.

As shown in FIG. 32, the controller of the dual camera module identifies whether a camera execution command is received (S10).

If the camera execution command is received, the controller identifies whether a first camera includes a first sensing module that senses movement of a first lens module (S20).

In this case, if the first camera does not include the first sensing module, the controller may drive the first camera and a second camera at the same time (S60).

Subsequently, if the first camera includes the first sensing module, the controller identifies whether the second camera includes a second sensing module that senses movement of a second lens module (S30).

In this case, if the second camera does not include the second sensing module, the controller may drive the first camera and the second camera at the same time (S60).

Next, if the second camera includes the second sensing module, the controller identifies whether the first sensing module of the first camera and the second sensing module of the second camera have the same types as each other (S40).

If the first sensing module of the first camera and the second sensing module of the second camera do not have the same types as each other, the controller may drive the first camera and the second camera at the same time (S60).

If the first sensing module of the first camera and the second sensing module of the second camera have the same types as each other, the controller controls the first camera and the second camera at different time zones (S50).

As described above, according to the present invention, the control time of the first and second cameras may be controlled depending on whether the sensor types of the first and second cameras are the same as each other, whereby signal interference occurring between the first and second cameras may be cancelled.

Also, according to the present invention, specification information of the camera may be received from any one of the memory, the external server, the installed camera, whereby the sensor type of the camera may be identified exactly.

Also, according to the present invention, the OIS compensator may be arranged at any one of the first and second cameras, whereby shaking of the lens module may be compensated.

Also, according to the present invention, the damper may be arranged between the spring and the damper to reduce natural frequency of the spring, whereby the auto-focus error may be avoided, and the auto-focus time may be reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A dual camera module comprising:
a first camera including a first lens module;
a second camera including a second lens module, arranged to adjoin the first camera; and
a controller for controlling the first camera and the second camera,
wherein the controller identifies whether the first camera includes a first sensing module for sensing movement of the first lens module if a camera execution command is received, identifies whether the second camera includes a second sensing module for sensing movement of the second lens module if the first camera includes the first sensing module, identifies whether the first sensing module of the first camera and the second sensing module of the second camera have the same type as each other if the second camera includes the second sensing module, and controls the first camera and the second camera at different time zones if the first sensing module and the second sensing module have the same types as each other.

2. The dual camera module according to claim 1, further comprising:
   a body module having a groove to which the first camera and the second camera are fixed; and
   a memory storing specification information and identification information of the first and second cameras.

3. The dual camera module according to claim 2, wherein, when identifying whether the first camera includes the first sensing module for sensing movement of the first lens module, the controller identifies whether the first camera includes the first sensing module, on the basis of the specification information of the first camera, which is stored in the memory.

4. The dual camera module according to claim 2, wherein, when identifying whether the second camera includes the second sensing module for sensing movement of the second lens module, the controller identifies whether the first camera includes the first sensing module, on the basis of the specification information of the first camera, which is stored in the memory.

5. The dual camera module according to claim 2, wherein, when identifying whether the first sensing module of the first camera and the second sensing module of the second camera have the same types as each other, the controller identifies the types of the first and second sensing module, on the basis of the specification information of the first and second cameras.

6. The dual camera module according to claim 1, wherein, when identifying whether the first sensing module of the first camera and the second sensing module of the second camera have the same types as each other, the controller controls the first and second cameras at different time zones if the first and second sensing modules are coil sensors.

7. The dual camera module according to claim 6, wherein the coil sensors sense a current or voltage varied depending on a distance with the first lens module or the second lens module.

8. The dual camera module according to claim 6, wherein, when the controller controls the first and second cameras at different time zones, a time zone for applying a driving signal for controlling movement of the first lens module to the first camera is different from a time zone for applying a driving signal for controlling movement of the second lens module to the second camera.

9. The dual camera module according to claim 8, wherein, when applying the driving signal to the first and second cameras, the controller synthesizes a random high frequency signal to the driving signal that is a low frequency signal.

10. The dual camera module according to claim 1, wherein, when identifying whether the first sensing module of the first camera and the second sensing module of the second camera have the same types as each other, the controller controls the first camera and the second camera at different time zones if the first and second sensing module are magnetic sensors.

11. The dual camera module according to claim 10, wherein each of the magnetic sensors senses a change of a magnetic flux according to movement of the first lens module or the second lens module, and is at least one of a hall sensor, a magnetic resistance sensor, and a search coil sensor.

12. The dual camera module according to claim 10, wherein, when the controller controls the first and second cameras at different time zones, a time zone for applying a driving signal for controlling movement of the first lens module to the first camera is different from a time zone for applying a driving signal for controlling movement of the second lens module to the second camera.

13. The dual camera module according to claim 1, wherein, when identifying whether the first camera includes the first sensing module for sensing movement of the first lens module, the controller drives the first camera and the second camera at the same time if the first camera does not include the first sensing module.

14. The dual camera module according to claim 1, wherein, when identifying whether the second camera includes the first sensing module for sensing movement of the second lens module, the controller drives the first camera and the second camera at the same time if the second camera does not include the second sensing module.

15. The dual camera module according to claim 1, wherein, when identifying whether the first sensing module of the first camera and the second sensing module of the second camera have the same types as each other, the controller drives the first camera and the second camera at the same time if the first sensing module and the second sensing module do not have the same types as each other.

16. The dual camera module according to claim 1, wherein at least one of the first and second cameras is a fixed focus camera,
   the fixed focus camera including:
   a fixed module provided with a through hole;
   a lens module having at least one lens, fixed within the through hole of the fixed module; and
   an image sensor for sensing an image incident through the lens of the lens module.

17. The dual camera module according to claim 16, wherein at least one of the first and second cameras further includes an optical image stabilization (OIS) compensator that compensates for shaking of the lens module.

18. The dual camera module according to claim 1, wherein at least one of the first and second cameras is an auto-focus camera that includes a magnetic sensor,
   the auto-focus camera including:
   a fixed module provided with a through hole;
   a lens module having at least one lens, linearly moving within the through hole of the fixed module;
   a moving coil surrounding an outer circumference of the lens module;
   a plurality of magnets arranged at an inner side of the through hole of the fixed module, sensing a change of a magnetic flux according to movement of the lens module;
   a magnetic flux distortion protrusion protruded from the outer circumference of the lens module, distorting a flow of the magnetic flux according to movement of the lens module; and
   an image sensor for sensing an image incident through the lens of the lens module.

19. The dual camera module according to claim 1, wherein at least one of the first and second cameras is an auto-focus camera that includes a coil sensor,
   the auto-focus camera including:
   a fixed module provided with a through hole;
   a lens module having at least one lens, linearly moving within the through hole of the fixed module;
   a moving coil surrounding an outer circumference of the lens module;

a coil sensor arranged in the fixed module, receiving a current or voltage varied depending on a distance with the moving coil from the moving coil; and an image sensor for sensing an image incident through the lens of the lens module.

20. A method for controlling a dual camera including a first camera having a first lens module and a second camera having a second lens module, comprising:

identifying whether a camera execution command is received;

identifying whether the first camera includes the first sensing module sensing movement of the first lens module, if the camera execution command is received;

identifying whether the second camera includes the second sensing module sensing movement of the second lens module, if the first camera includes the first sensing module;

identifying whether the first sensing module of the first camera and the second sensing module of the second camera have the same types as each other, if the second camera includes the second sensing module; and controlling the first camera and the second camera at different time zones, if the first sensing module of the first camera and the second sensing module of the second camera have the same types as each other.

* * * * *